(12) United States Patent
Krawczyk et al.

(10) Patent No.: US 7,985,809 B2
(45) Date of Patent: Jul. 26, 2011

(54) POLYMER SOLUTIONS

(75) Inventors: Gerhard Erich Krawczyk, Bremen (DE); Kevin Michael Miller, West Dundee, IL (US)

(73) Assignee: Rohm and Haas Company, Philadelphia, PA (US)

( * ) Notice: Subject to any disclaimer, the term of this patent is extended or adjusted under 35 U.S.C. 154(b) by 236 days.

(21) Appl. No.: 12/157,883

(22) Filed: Jun. 13, 2008

(65) Prior Publication Data

US 2009/0005501 A1 Jan. 1, 2009

Related U.S. Application Data

(60) Provisional application No. 60/937,469, filed on Jun. 28, 2007.

(51) Int. Cl.
  *C08F 283/00* (2006.01)
  *C08F 290/14* (2006.01)
  *C08G 63/60* (2006.01)

(52) U.S. Cl. ............ 525/529; 525/50; 525/191; 525/59; 525/43; 525/300; 524/599; 524/543; 524/556; 524/580; 524/773

(58) Field of Classification Search .......... 524/599, 524/543, 556, 558, 580; 525/471, 298, 300, 525/301, 313, 59, 43, 50, 529, 191
See application file for complete search history.

(56) References Cited

U.S. PATENT DOCUMENTS

| | | | | |
|---|---|---|---|---|
| 4,408,018 A | * | 10/1983 | Bartman et al. | 525/300 |
| 5,017,649 A | * | 5/1991 | Clemens | 525/59 |
| 5,539,017 A | * | 7/1996 | Rheinberger et al. | 523/116 |
| 5,562,953 A | * | 10/1996 | Bors et al. | 427/558 |
| 5,576,406 A | * | 11/1996 | Yamamura et al. | 526/320 |
| 5,679,738 A | * | 10/1997 | Bafford et al. | 524/555 |
| 5,763,527 A | | 6/1998 | Chen | |
| 5,824,743 A | | 10/1998 | Krawczyk | |
| 6,706,414 B1 | * | 3/2004 | Dammann et al. | 428/524 |
| 7,041,749 B2 | * | 5/2006 | Dammann et al. | 525/532 |
| 7,119,144 B2 | | 10/2006 | Dietch | |
| 7,169,825 B2 | * | 1/2007 | Narayan-Sarathy et al. | 522/13 |
| 7,291,658 B2 | * | 11/2007 | Narayan-Sarathy et al. | 523/160 |
| 7,335,690 B2 | * | 2/2008 | Plaut et al. | 522/34 |
| 7,396,429 B2 | | 7/2008 | Beckley | |
| 2005/0027082 A1 | * | 2/2005 | Narayan-Sarathy et al. | 525/471 |
| 2005/0081995 A1 | * | 4/2005 | Beckley et al. | 156/325 |
| 2005/0245711 A1 | * | 11/2005 | Narayan-Sarathy et al. | 526/302 |
| 2005/0245721 A1 | * | 11/2005 | Beckley et al. | 528/271 |
| 2005/0272830 A1 | * | 12/2005 | Gould et al. | 522/182 |
| 2006/0078742 A1 | * | 4/2006 | Kauffman et al. | 428/411.1 |
| 2006/0167180 A1 | * | 7/2006 | Plaut et al. | 525/187 |
| 2006/0247374 A1 | * | 11/2006 | Beckley et al. | 525/54.2 |
| 2008/0242814 A1 | | 10/2008 | Nahm | |

OTHER PUBLICATIONS

B. D. Mather, et. al. "Michael addition reactions in macromolecular design for emerging technologies," Progress in Polymer Science, v.31, pp. 487-531, 2006.

R.J. Clemens and F. Del Rector, "A Comparison of Catalysts for Crosslinking Acetoacetylated Resins via the Michael . . . ," J. Coatings Technol., v. 61, No. 770, pp. 83-91, 1989.

* cited by examiner

*Primary Examiner* — Mark Eashoo
*Assistant Examiner* — Jane L Stanley
(74) *Attorney, Agent, or Firm* — Carl P. Hemenway

(57) ABSTRACT

There is provided a method of making a polymer solution comprising polymerizing one or more monomer in a solvent, wherein said monomer comprises one or more ethylenically unsaturated monomer that is a multi-functional Michael donor, and wherein said solvent comprises 40% or more by weight, based on the weight of said solvent, one or more multi-functional Michael donor.

12 Claims, No Drawings

POLYMER SOLUTIONS

This application claims the benefit of priority under 35 U.S.C. §119(e) of U.S. Provisional Patent Application No. 60/937,469 filed on Jun. 28, 2007.

This invention was made with Government support under Contract No. DE-FG36-04GO14317 awarded by the Department of Energy. The Government has certain rights in this invention.

BACKGROUND

In the past, polymeric Michael donor compounds have been made by solution polymerization, for example as taught by U.S. Pat. No. 4,408,018, in which acetoacetate-functional monomers are copolymerized with other monomers, and the polymerization takes place in the solvent 2-butoxy ethanol. For many purposes, the solvent must subsequently be removed. It is desired to provide polymer solutions of polymeric Michael donor that reduces or eliminates the necessity of removing solvent.

STATEMENT OF THE INVENTION

In one aspect of the present invention, there is provided a method of making a polymer solution comprising polymerizing one or more monomer in a solvent, wherein said monomer comprises one or more ethylenically unsaturated monomer that is a multi-functional Michael donor, and wherein said solvent comprises 40% or more by weight, based on the weight of said solvent, one or more multi-functional Michael donor.

DETAILED DESCRIPTION

As used herein, "(meth)acrylate" means acrylate or methacrylate; "(meth)acrylic" means acrylic or methacrylic; and "(meth)acrylamide" means acrylamide or methacrylamide.

As used here in, a compound that is "ethylenically unsaturated" contains at least one carbon-carbon double bond.

The present invention involves the use of compounds with functional groups capable of undergoing a Michael addition reaction. Michael addition is taught, for example, by R T Morrison and R N Boyd in *Organic Chemistry*, third edition, Allyn and Bacon, 1973. The reaction is believed to take place between a Michael donor and a Michael acceptor, in the presence of a catalyst.

A "Michael donor," as used herein, is a compound with at least one Michael donor functional group, which is a functional group containing at least one Michael active hydrogen atom, which is a hydrogen atom attached to a carbon atom that is located between two electron-withdrawing groups such as C=O and/or C=N. Examples of Michael donor functional groups are malonate ester groups, acetoacetate ester groups, malonamide groups, and acetoacetamide groups (in which the Michael active hydrogens are attached to the carbon atom between two carbonyl groups); and cyanoacetate ester groups and cyanoacetamide groups (in which the Michael active hydrogens are attached to the carbon atom between a carbonyl group and a cyano group). A compound with two or more Michael active hydrogen atoms is known herein as a multi-functional Michael donor. A Michael donor may have one, two, three, or more separate functional groups that each contain one or more Michael active hydrogen atoms. The total number of Michael active hydrogen atoms on the molecule is the functionality of the Michael donor. As used herein, the "skeleton" of the Michael donor is the portion of the donor molecule other than the functional group containing the Michael active hydrogen atom(s).

A "Michael acceptor," as used herein, is a compound with at least one functional group with the structure (I)

where $R^1$, $R^2$, and $R^4$ are, independently, hydrogen or organic radicals such as for example, alkyl (linear, branched, or cyclic), aryl, aryl-substituted alkyl (also called aralkyl or arylkyl), and alkyl-substituted aryl (also called alkaryl or alkylaryl), including derivatives and substituted versions thereof. $R^1$, $R^2$, and $R^4$ may or may not, independently, contain ether linkages, carboxyl groups, further carbonyl groups, thio analogs thereof, nitrogen-containing groups, or combinations thereof. $R^3$ is oxygen, a nitrogen-containing group, or a divalent version of any of the organic radicals described above for $R^1$, $R^2$, and $R^4$. A compound with two or more functional groups, each containing structure (I), is known herein as a multi-functional Michael acceptor. The number of functional groups containing structure (I) on the molecule is the functionality of the Michael acceptor. As used herein, the "skeleton" of the Michael acceptor is the portion of the donor molecule other than structure (I). Any structure (I) may be attached to another (I) group or to the skeleton directly.

The practice of the present invention involves the use of at least one Michael catalyst. A "Michael catalyst," as used herein, is a compound that will catalyze a Michael addition reaction. While the invention is not limited to any specific theory, it is believed that the catalyst abstracts a hydrogen ion from the Michael donor.

Herein, when a compound is described as an ester of a certain acid (for example, RC(O)OH) and a certain alcohol (for example, R'OH), the compound is considered to be the compound with the structure RC(O)OR', whether or not the compound is actually made by reacting that acid with that alcohol or is made by another method. When a compound is described as being an amide corresponding to a certain ester (for example, RC(O)OR'), the amide that is meant is either RC(O)NHR' or RC(O)NR'R", where R' and R" are both attached to the N atom, and R" is similar to or identical to R'.

A "polymer," as used herein and as defined by F W Billmeyer, JR. in *Textbook of Polymer Science*, second edition, 1971 is a relatively large molecule made up of the reaction products of smaller chemical repeat units. Normally, polymers have 11 or more repeat units. Polymers may have structures that are linear, branched, star shaped, looped, hyperbranched, or crosslinked; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that react with other molecules to form a polymer are known as monomers.

Forming a polymer involves chemical reactions among monomers to form polymer. Such chemical reactions are known as polymerizing reactions or synonymously as polymerization. The residues of the monomer molecules are the repeat units of the polymer.

As used herein, a polymer solution is a composition that is liquid at 25° C., that contains polymer and solvent, and in which the polymer molecules are dispersed the solvent. It is well known that polymer solutions take a variety of forms. Included herein are all forms in which the polymer molecules remain dispersed for at least 24 hours at 25° C. For example, the solvent may be a so-called "good" solvent for the polymer, and the polymer molecules are dissolved and are in a relatively extended conformation. In other cases, the solvent is a "poor" solvent and the polymer molecules are dissolved and are in a relatively compact conformation. Also included are cases in which polymer molecules are aggregated with each other and the aggregates are dispersed in the solvent.

As used herein a solvent in a polymer solution is any non-polymeric compound or mixture of non-polymeric compounds that dissolves or disperses the polymer. Solvents that contain 50% or more water based on the weight of solvent are known herein as "aqueous." Solvents that are not aqueous are known herein as "non-aqueous."

The practice of the present invention involves polymerizing one or more monomer in solvent. In some embodiments, the solvent is one or more compound that is not an ethylenically unsaturated monomer. The solvent is liquid at 25° C. In some embodiments, the solvent has boiling point at one atmosphere pressure of 50° C. or higher, or 100° C. or higher.

In the practice of the present invention, the solvent in which polymerization takes place comprises one or more multi-functional Michael donor. Suitable multi-functional Michael donor may have any skeleton, as long as the solvent is suitable, as described herein above. Some suitable skeletons are, for example, alkyl groups such as, for example, alkyl groups with 1 to 8 carbon atoms, or 2 to 6 carbon atoms. Such alkyl groups may be linear, branched, cyclic, or a combination thereof. Independently, some suitable skeletons are heterocycles (cyclic groups that contain, within the cycle, one or more atom other than carbon), such as, for example, the ring structures found in glucose, sucrose, or isosorbide.

Multi-functional Michael donors that are suitable to be included in the solvent are known herein as "solvent-suitable" multi-functional Michael donors.

One group of solvent-suitable multi-functional Michael donors includes, for example, compounds that have the structure of esters of an acid that contains a Michael functional group with an alcohol. Acids suitable for inclusion in such esters include, for example, acetoacetic acid, cyanoacetic acid, malonic acid, and mixtures thereof. Alcohols suitable for inclusion in such esters include mono-alcohols (compounds that have one hydroxyl group per molecule) and polyols (compounds that have two or more hydroxyls per molecule). Some suitable mono-alcohols are, for example, alkyl alcohols with 1 to 8 carbons, including, for example, ethanol. Some suitable polyols include, for example, linear and branched alkyl polyols with 2 to 8 carbons, or with 3 to 6 carbons, including, for example, glycerol and trimethylol propane. Alternative or additional suitable polyols include, for example, polyols derived from biological sources, such as, for example, isosorbide, castor oil, glucose, and sorbitol. Esters involving polyols may have exactly one hydroxyl group converted to participation in an ester linkage to an acid, or may have exactly two hydroxyl groups converted into participation in ester linkages to two acids, or may have more than two hydroxyl groups converted into participation in ester linkages to acids.

Some solvent-suitable multi-functional Michael donors include, for example, ethyl acetoacetate, trimethylolpropane trisacetoacetate, glycerol trisacetoacetate, and isosorbide bisacetoacetate.

Also solvent-suitable multi-functional Michael donors are amides that correspond to any of the esters described herein above as suitable multifunctional Michael donors.

Solvent-suitable multi-functional Michael donors may usefully be described by their molecular weight, independently of their chemical composition. In some embodiments, the solvent contains one or more multi-functional Michael donor that has number-average molecular weight of 1,000 or less. In some embodiments, the solvent contains one or more multi-functional Michael donor that has number-average molecular weight of 500 or less.

In some embodiments, the solvent contains one or more multi-functional Michael donor that has no carbon-carbon double bond. In some embodiments, the solvent contains one or more multi-functional Michael donor that does not participate in free radical polymerization with ethylenically unsaturated monomer.

Mixtures of solvent-suitable multi-functional Michael donors are also solvent-suitable.

In some embodiments, the amount of multi-functional Michael donor in the solvent, by weight based on the weight of solvent, is 40% or more, or 50% or more; or 75% or more; or 90% or more; or 95% or more; or 100%. In some embodiments, the solvent contains one or more multi-functional donor that contains one or more acetoacetate groups. In some embodiments, the solvent contains one or more multi-functional donor that contains no Michael donor functional group that is not acetoacetate. In some embodiments, every multi-functional donor in the solvent contains no Michael donor functional group that is not acetoacetate.

The practice of the present invention involves the use of ethylenically unsaturated monomer that is a multi-functional Michael donor, known herein as a "Michael donor monomer." A Michael donor monomer is any compound that has both a carbon-carbon double bond and two or more Michael active hydrogen atoms. Some suitable Michael donor monomers include, for example, esters of (meth)acrylic acid with the structure

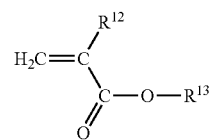

where $R^{12}$ is methyl or hydrogen, and $R^{13}$ is a group that contains two or more Michael active hydrogens. In some embodiments, $R^{13}$ has the structure

where $-R^{14}-$ is a divalent alkyl radical with 1 to 6 carbon atoms such as, for example, ethyl (i.e., $-CH_2CH_2-$), and $R^{15}$ is acetoacetate, cyanoacetate, or malonate. In some embodiments, $R^{14}$ is ethyl and $R^{15}$ is acetoacetate.

Mixtures of suitable Michael donor monomers are also suitable.

In some embodiments of the present invention, in addition to the one or more Michael donor monomer, one or more ethylenically unsaturated monomer is used that is not a multi-functional Michael donor. An ethylenically unsaturated monomer that is not a multi-functional Michael donor is known herein as a non-Michael monomer.

Suitable non-Michael monomers include any ethylenically unsaturated compound that is not a multi-functional Michael donor and that can copolymerize with Michael donor monomer. Some suitable non-Michael monomers include, for example, carboxyl monomers, functional monomers, hydrophilic monomers, and neutral monomers.

Carboxyl monomers are monomers with a carboxyl group or salt thereof. Some suitable carboxyl monomers include, for example, itaconic acid, fumaric acid, maleic acid, acrylic acid, methacrylic acid, and mixtures thereof. In some embodiments, when carboxyl monomer is used, carboxyl monomer is selected from acrylic acid, methacrylic acid, or a mixture thereof. Carboxyl monomers are optional in the present invention.

Functional monomers are monomers that are not carboxyl monomers and that have a reactive functional group. Suitable reactive functional groups include, for example, glycidyl groups. Suitable functional monomers include, for example glycidyl methacrylate. In some embodiments in which functional monomer is used, the only functional monomer is glycidyl methacrylate. Functional monomers are optional in the present invention.

Hydrophylic monomers are monomers that are not carboxyl monomers, that are not functional monomers, and that have a relatively polar group. Suitable relatively polar groups are, for example, hydroxyl groups and amide groups. In some embodiments, hydrophylic monomer, if used, is selected from monomers with hydroxyl groups, monomers with amide groups, and mixtures thereof. Some suitable amide groups include, for example, amide groups with no substituent on the nitrogen, those with one substituent on the nitrogen, and those with two substituents on the nitrogen. Some suitable hydrophylic monomers with amide groups include, for example, (meth)acrylamide, N-alkyl (meth)acrylamide, and N,N-dialkyl (meth)acrylamide, where the alkyl group is linear, branched, or cyclic, with 1 to 6 carbon atoms. Independently, some suitable hydrophylic monomers include, for example, hydroxyalkyl (meth)acrylate, where the alkyl group is linear, branched, or cyclic, with 1 to 6 carbon atoms. Some suitable hydrophylic monomers with hydroxyl groups include, for example, hydroxyethyl (meth)acrylate and hydroxypropyl (meth)acrylate. In some embodiments in which a hydrophylic monomer is used, hydrophylic monomer is selected from hydroxyethyl acrylate, hydroxyethyl methacrylate, N,N-dimethyl acrylamide, and mixtures thereof. Hydrophylic monomer is optional in the present invention.

Neutral monomers are monomers that are not carboxyl monomers, that are not functional monomers, and that are not hydrophylic monomers. Some suitable neutral monomers include, for example, olefins (such as, for example, butadiene), vinyl acetate, styrene, substituted styrenes, and alkyl esters of (meth)acrylic acid. In some embodiments, neutral monomer is selected from olefins (such as, for example, butadiene), vinyl acetate, styrene, substituted styrenes, alkyl esters of (meth)acrylic acid, and mixtures thereof. In some embodiments, neutral monomer is selected from styrene, substituted styrenes, alkyl esters of (meth)acrylic acid, and mixtures thereof. Suitable substituted styrenes include, for example, alkyl styrene, such as, for example, alpha-methyl styrene. Suitable alkyl esters of (meth)acrylic acid include, for example, those with alkyl groups (which may be linear, branched, cyclic, or a combination thereof) with 1 to 24 carbon atoms. Some suitable alkyl esters of (meth)acrylic acid include, for example, those with alkyl groups with 1 to 4 carbon atoms. Some suitable neutral monomers include, for example, styrene, butyl acrylate, methyl methacrylate, and mixtures thereof. Neutral monomers are optional in the present invention.

Among embodiments in which non-Michael monomer is used, in some of such embodiments, the amount of Michael donor monomer is 1% to 40% by weight, based on the total weight of monomer, and the amount of non-Michael monomer is 60% to 99% by weight, based on the total weight of monomer. In some of such embodiments, the amount of Michael donor monomer is 2% or more; or 4% or more, by weight based on the total weight of monomer. Independently, in some of such embodiments, the amount of Michael donor monomer is 30% or less; or 25% or less, by weight based on the total weight of monomer.

In the practice of the present invention, if non-Michael monomer is used, any type of non-Michael monomer may be used, independently of the presence of or of the amounts of any other types of non-Michael monomer that may be present.

In some embodiments, one or more neutral non-Michael monomer is used. In some of such embodiments, the total amount of neutral non-Michael monomer is 20% to 100% by weight, based on the total weight of non-Michael monomer. In some embodiments in which one or more neutral non-Michael monomer is used and in which one or more carboxyl non-Michael monomer is used, the ratio of the total weight of carboxyl non-Michael monomer to the total weight of neutral non-Michael monomer is from 0.003 to 0.5. Independently, in some embodiments in which one or more neutral non-Michael monomer is used and in which one or more functional non-Michael monomer is used, the ratio of the total weight of functional non-Michael monomer to the total weight of neutral non-Michael monomer is from 0.009 to 1.5. Independently, in some embodiments in which one or more neutral non-Michael monomer is used and in which one or more hydrophilic non-Michael monomer is used, the ratio of the total weight of hydrophilic non-Michael monomer to the total weight of neutral non-Michael monomer is from 0.03 to 2.

In some embodiments, a chain transfer agent is used during polymerization. Chain transfer agent is not considered herein to be a monomer. It is contemplated that chain transfer agents act to reduce the molecular weight of the polymer that is produced by the polymerization process. Some chain transfer agents include, for example, mercaptans such as, for example, dodecyl mercaptan, mercaptopropyl trimethoxysilane, and mixtures thereof. The use of chain transfer agents is optional. In some embodiments in which a chain transfer agent is used, the amount of chain transfer agent is, for example, by weight based on the total weight of monomer, 0.5% or more; or 0.8% or more. Independently, in some embodiments in which a chain transfer agent is used, the amount of chain transfer agent is, for example, by weight based on the total weight of monomer, 3% or less; or 2.5% or less; or 2% or less.

The process of the present invention involves polymerizing one or more monomer in a solvent to produce polymner. In some embodiments, the polymer is soluble in the solvent in which polymerization took place. At the conclusion of polymerization, it is useful to characterize the solution by the polymer solids, which is the weight of solid polymer as a percentage of the total weight of polymer solution. In some embodiments, the polymer solids is 33% to 55%. Independently, in some embodiments, the weight-average molecular weight of the polymer is 5,000 or greater; or 9,000 or greater. Independently, in some embodiments, the weight-average molecular weight of the polymer is 100,000 or lower; or 80,000 or lower, or 60,000 or lower. Independently, in some embodiments, the glass transition temperature of the polymer is −60° C. or higher; or −40° C. or higher. Independently, in some embodiments, the glass transition temperature of the polymer is 90° C. or lower; or 120° C. or lower. The glass transition temperature (Tg) is measured by differential scanning calorimetry.

In some embodiments, the polymer formed by the process of the present invention contains at least one polymer formed by chain reaction of the carbon-carbon double bonds of ethylenically unsaturated monomers. Such polymers are known herein as vinyl polymers. In some embodiments, no polymer is present in the polymer solution of the present invention that is a polyester polymer. A polyester polymer is a polymer that has at least one ester linkage as part of the backbone of the polymer. Independently, in some embodiments, no polymer is present in the polymer solution of the present invention that is a polyurethane polymer. A polyurethane polymer is a polymer that has at least one urethane linkage as part of the backbone of the polymer. In some embodiments, every polymer present in the polymer solution is a vinyl polymer.

In some embodiments, polymerization in solvent is free radical polymerization. Free radical polymerization is often conducted by adding initiator to the solution of solvent and monomer. Initiator, if used, may be of any type including, for example, initiators that produce free radical from combination of oxidation/reduction pairs of compounds, from application of temperature elevated above 25° C., from application of radiation (such as, for example, ultraviolet or electron beam), or from combination thereof.

It is contemplated that, at the conclusion of polymerization, the polymer solution will contain little or no ethylenically unsaturated monomer. In some embodiments, the amount of ethylenically unsaturated monomer, by weight based on the dry weight of polymer produced by the polymerization, is 5% or less; or 2% or less; or 1% or less.

It is contemplated that the polymerization process will leave most or all of the Michael donor functional groups intact. It is contemplated that the polymer produced by the polymerization will be a multi-functional Michael donor.

It is contemplated that one use for the polymer solution of the present invention is as one ingredient in a curable mixture that contains the polymer solution of the present invention, along with one or more multi-functional Michael acceptor, one or more Michael catalyst, and, optionally, one or more additional ingredients.

Suitable multi-functional Michael acceptors include, for example, multi-functional acrylates. A multi-functional acrylate is a molecule that has two or more structure (II) attached to the same molecule, where each structure (II) is a version of structure (I) in which $R^1$ and $R^2$ are both hydrogen, $R^4$ is hydrogen or methyl, and —R3— is either —O— or —NH— or —N(alkyl)-. Each structure (II) may be attached to the skeleton by any type of bond. For example, in some embodiments, the bond that attaches structure (II) to the skeleton is an ester linkage that can be described as the ester linkage that would be formed if (meth)acrylic acid formed an ester with a hydroxyl group on the skeleton. Also contemplated are, for example, bonds between structure (II) and skeleton that have the form of amides corresponding to such esters. Further contemplated are, for example, bonds between structure (II) and skeleton that have the form of bonds that would be formed if (meth)acrylic acid reacted with some other acid-reactive group on the skeleton. Further contemplated are, for example, bonds between structure (II) and skeleton that have the form of bonds that would be formed if hydroxyl group on hydroxylalkyl (meth)acrylate reacted to form a bond with a hydroxyl-reactive group (such as, for example, isocyanate, carboxyl, or other hydroxyl-reactive group) on the skeleton.

Mixtures of suitable multi-functional Michael acceptors are also suitable.

Suitable Michael catalysts include, for example, strong bases and weak bases. Strong bases have pKa of the conjugate acid of greater than 11. Weak bases have pKa of the conjugate acid of 3 to 11. Strong bases include, for example, bases with pKa of the conjugate acid greater than 11 that belong to such categories as, for example, phosphates, silicates, alkali metal alkoxides, tertiary amines, and cyclic amines. Weak bases include, for example, bases with pKa of the conjugate acid of 3 to 11 that belong to such categories as, for example, imidazolines, phosphines, hydrogen phosphates, dihydrogen phosphates, alkali metal carboxylates, alkali metal carbonates, and alkali metal bicarbonates. Also suitable as Michael catalysts are anions of Michael donors formed by abstraction of one Michael active hydrogen.

Mixtures of suitable multi-functional Michael catalysts are also suitable.

It is contemplated that the curable mixture can be cured. That is, some or all of the Michael donor functional groups react with some or all of the structure (I) groups to form polymers, which may be linear, branched, and/or crosslinked. In some embodiments, cure takes place at temperature between 25° C. and 100° C.; in some embodiments, cure takes place at 25° C.

The cured form of the curable mixture is solid at 25° C. The cured form of the curable fluid may be a glassy solid, a rubbery solid, or any other type of solid. In some embodiments, the cured form of the curable mixture contains polymer with weight-average molecular weight of 100,000 or higher, or crosslinked polymer, or a mixture thereof.

One useful way of characterizing the curable mixture is the total curable solids, which is defined herein as the sum, as a percentage of the total weight of the curable mixture, of the weights of all materials in the curable mixture that are Michael donors, Michael acceptors, and materials that, if isolated in the pure state, are solid at 25° C. In some embodiments, the total curable solids of the curable mixture is 50% or more; or 75% or more; or 90% or more; or 95% or more; or 98% or more.

It is contemplated that, in some embodiments, a polymer solution of the present invention may be produced in which the solvent is made entirely (except, possibly, for inconsequential amounts of impurities) of one or more multi-functional Michael donors; such a polymer solution may, for example be blended with one or more multi-functional Michael acceptors, and one or more Michael catalyst, both of which, in some cases, may be soluble in the solvent. In some of such embodiments, the Michael catalyst may be supplied as a solution in a solvent that is not multi-functional Michael donor. Embodiments are contemplated in which the solvent introduced to the curable mixture as part of a catalyst solution is the only liquid that is present in the curable mixture that is neither a multi-functional Michael donor nor a multi-functional Michael acceptor, except, possibly, for inconsequential amounts of impurities.

In some embodiments, the curable mixture is liquid at 25° C. In some of such embodiments, the curable mixture has viscosity at 45° C. at shear rate of 0.01 $sec^{-1}$ of 100 Pa*s (100,000 cps) or less; or 30 Pa*s (30,000 cps) or less; or 10 Pa*s (10,000 cps) or less; or 3 Pa*s (3,000 cps) or less. Independently, the "Brookfield viscosity" of the curable mixture may usefully be measured with a Brookfield viscometer (for example, model DV-I+, with spindle number 25, using revolution rate sufficient to give a reading of 20% to 80% of full scale). In some embodiments, the Brookfield viscosity of the curable mixture at 45° C. is 100 Pa*s (100,000 cps) or less; or 30 Pa*s (30,000 cps) or less; or 10 Pa*s (10,000 cps) or less; or 3 Pa*s (3,000 cps) or less.

The curable mixture formed by mixing polymer solution of the present invention with one or more multi-functional Michael acceptor and one or more Michael catalyst may be used for any purpose. Some suitable purposes include, for example, formation of coatings, adhesives, sealants, elastomers, and foams. In some embodiments, the curable mixture is used as an adhesive. In such embodiments, it is contemplated that a layer of curable mixture is applied to a substrate, a second substrate is brought into contact with that layer of curable mixture, and the curable mixture is cured or allowed to cure while in contact with both substrates. In some embodiments, the substrates are both relatively thin and flat and the curable mixture acts as an adhesive to bond the flat face of one substrate to the flat face of the other; in such embodiments, the curable mixture is known as a laminating adhesive.

In the curable mixture of the present invention, the solvent contains at least one multi-functional Michael donor that is not a polymer. It is contemplated that such curable mixtures contain two or more multi-functional Michael donors: one or more multi-functional Michael donor is contained in the solvent and is not a polymer, and one or more multi-functional Michael donor is the result of the polymerization of monomer that contains one or more ethylenically unsaturated monomer that is a multi-functional Michael donor.

In some embodiments, it is contemplated that the curable mixture of the present invention will possess a combination of desirable properties: the benefit of desirable low viscosity, the benefit of a solvent that is partially or completely a multi-functional Michael donor, and the benefit of improved green strength.

Green strength is a property of composite articles that are made by contacting two or more substrates to a layer of a curable adhesive composition. Green strength is the strength of the adhesive bond that develops in a short time, usually prior to the completion of the process of curing the adhesive composition.

For example, in flexible film laminating, low viscosity is desired to allow applying a layer of curable mixture on a high speed coating line; high green strength is desired to prevent premature delamination (known as "tunneling") of the laminated films; and inclusion of multi-functional Michael donor in the solvent is desired to reduce or eliminate the need to remove solvent from the adhesive.

Independently, some of such embodiments are contemplated to have the characteristic that specific embodiments may, if desired, be designed to control both the viscosity of the curable mixture prior to curing and the rheological properties of the cured form of the curable mixture. For example, if it is intended to use the cured form of the curable mixture as a pressure sensitive adhesive, it is desired that the cured form of the curable mixture contain polymer of relatively low Tg (below 20° C., or below 10° C., or below 0° C.) with relatively low crosslink density. The relatively low crosslink density may, for example, be provided by conducting the polymerization process of the present invention using a mixture of monomers that contains a relatively small amount of ethylenically unsaturated monomer that is multi-functional Michael donor and a relatively large amount of other ethylenically unsaturated monomer, with the monomers chosen to provide the desired Tg. Desirably low viscosity of the uncured form of the curable mixture may be provided by the presence of solvent, and the need for solvent removal may be reduced or eliminated by the inclusion of one or more multi-functional Michael donor that is not a polymer in the solvent.

It is to be understood herein that any operations are performed at 25° C. and one atmosphere pressure unless a specific statement is made otherwise.

Also, it is to be understood herein that when a category is named and a composition is said to contain members of that category "selected from" a certain list, it is meant that the composition contains no members of that category other than those named in the certain list. For example, when it is stated that carboxyl monomer for making the polymer is selected from acrylic acid, methacrylic acid, or a mixture thereof, it is understood that the monomers used for making the polymer contain no carboxyl monomer other than acrylic acid, methacrylic acid, and mixtures thereof.

EXAMPLES

The examples below, the following abbreviations are used:
AAEM=acetoacetoxyethyl methacrylate
TMP trisAcAc=trimethylolpropane trisacetoacetate
BA=butyl acrylate
MMA=methyl methacrylate
AA=acrylic acid
MPTMS=3-mercaptopropyl trimethoxysilane
DDM=dodecylmercaptan
HEA=hydroxyethyl acrylate
HEMA=hydroxyethyl methacrylate
DMA=N,N-dimethyl acrylamide
VTMS=vinyl trimethoxysilane
MATS=3-trimethoxysilylpropyl methacrylate
GMA=glycidyl methacrylate
Init=initiator (Vazo™ 67, a substituted azonitrile compound from Dupont Co.)
Tg=glass transition temperature, calculated by the Fox equation
Mw=weight-average molecular weight, as measured by size exclusion chromatography
% Sol=polymer solids, as defined herein above
CTA=chain transfer agent
ND=not determined
Solv=solvent
SR-259=polyethylene glycol (200) diacrylate, from Sartomer Co.
Morcure™ 2000=diacrylate of diglycidyl ether bisphenol-A, from Rohm and Haas Co.
TRPGDA=tripropylene glycol diacrylate
Cat Mix=Michael catalyst mixture, containing, by weight, based on the weight of Cat Mix, 35% $Na_2CO_3$, 36% Morcure™ 2000, 29% TRPGDA.

Example 1

Procedure for Making Polymer Solutions

A 500-mL, four-necked flask was charged with 110 g solvent and warmed to 90° C. using a mechanical stirrer and pneumatic pot lifter with temperature controls. To one arm of the flask was equipped an addition funnel with Part A (initiator and solvent) and another flask arm equipped with an addition funnel containing Part B (containing monomers, including AAEM, acrylates, methacrylates, chain-transfer agents, acid buffers, etc.). For Part A, the initiator was dissolved in solvent. Once the reaction vessel reached 90° C., both addition funnels were opened so that there was a steady rate of both parts into the reaction vessel. Addition rates were adjusted so that addition of the monomer solution (Part B) lasted approximately 1 hour while the initiator solution (Part A) added over approximately 1.25 hours. After both additions were complete, the reaction solution stirred at 90° C. for 1 hour followed by an additional charge of initiator directly to the flask. An additional chase was typically completed after another hour to drive down residual monomer. Stirring at 90° C. continued for one additional hour before the reaction was stopped. Solution polymer was then transferred to separate container while warm.

Example 2

TMP trisAcAc Solvent

Using the method of Example 1 with TMP trisAcAc as the solvent, the following polymer solutions were made. The amount of each monomer is parts by weight.

| No. | BA | AAEM | MMA | AA | % Sol | Tg °C | Mw |
|---|---|---|---|---|---|---|---|
| 1 | 23.1 | 9.9 | — | 0.3 | 33.1 | −35.6 | 40862 |
| 2 | 19.2 | 4.2 | 19.2 | 0.4 | 43.0 | 6.3 | 26474 |
| 3 | 16.9 | 8.7 | 16.9 | 0.4 | 43.0 | 7.7 | 26586 |
| 4 | 12.0 | 7.1 | 28.8 | 0.5 | 48.4 | 35.9 | 33964 |
| 5 | 8.4 | 5.2 | 20.4 | 0.4 | 34.5 | 35.9 | 28231 |

Example 3

Functionalized Polymers in TMP trisAcAc Solvent

Using the method of Example 2, the following polymers were made and tested, with the results shown below. For each polymer, the monomers and the chain transfer agent(s) are shown in table 3-1; and the characteristics of the resulting polymers are shown in table 3-2.

TABLE 3-1

| No | AAEM | BA | MMA | STY | HEA | HEMA | DMA | AA | MAA | CTA |
|---|---|---|---|---|---|---|---|---|---|---|
| 6 | 14.3 | 7.1 | — | — | — | — | 21.4 | 0.5 | — | — |
| 7 | 5.0 | 6.3 | 15.3 | 3.3 | 3.3 | — | — | 0.3 | — | 0.2% DDM |
| 8 | 6.8 | — | 22.2 | — | — | 8.5 | — | — | 0.6 | 0.4% MPTMS |
| 9 | 8.9 | 1.7 | 24.5 | — | — | 6.4 | — | — | 0.6 | 0.6% MPTMS |

TABLE 3-2

| No. | % Slds | Tg °C | Mw |
|---|---|---|---|
| 6 | 43.2 | 42.2 | 62000 |
| 7 | 35.0 | 34.7 | 46182 |
| 8 | 40.3 | 74.5 | 49046 |
| 9 | 44.1 | 65.0 | 34125 |

Example 4

Functionalized Polymers with Glycerol Trisacetoacetate Solvent

Using the method of Example 2, except that the solvent was glycerol trisacetoacetate, the following polymers were made and tested, with the results shown below. For each polymer, the monomer(s), chain transfer agent(s), and other notes are shown in table 4-1; and the characteristics of the resulting polymers are shown in table 4-2.

TABLE 4-1

| No. | AAEM | BA | MMA | STY | HEA | GMA | AA | Init | Notes |
|---|---|---|---|---|---|---|---|---|---|
| 10 | 14.3 | 5.3 | 44.9 | 5.3 | 19.0 | — | 1.3 | 4.8 | 3.1% DDM/ 1.96% MPTMS |
| 11 | 14.2 | 5.3 | 44.9 | 5.3 | 19.0 | — | 0.5 | 4.7 | 1.8% DDM/ 2.0% PPA/ 2.0% MPTMS |
| 12 | 15.2 | 4.6 | 39.3 | 4.6 | 10.2 | 15.2 | 1.2 | 4.2 | 2.8% DDM/ 2.8% MPTMS |
| 13 | 18.8 | 47 | — | 14.1 | 14.1 | — | 0.9 | 3.8 | 1.3% MPTMS |
| 14 | 19.8 | 13.5 | 45.8 | — | 14.1 | — | 1.4 | 4.1 | 1.4% MPTMS |
| 15 | 5.1 | 54.2 | 35.6 | — | — | — | 5.5 | 2.5 | 1.5 DDM |
| 16 | 5.1 | — | 35.5 | — | 54.0 | — | 5.5 | 2.5 | 1.9 DDM |
| 17 | 5.1 | 54 | — | — | 35.5 | — | 5.5 | 2.5 | 1.9 DDM |
| 18 | 5.1 | 54 | 35.5 | — | — | — | 5.5 | 2.5 | 1.9 DDM |
| 19 | 5 | — | 51 | — | 38.5 | — | 5.5 | 2.5 | 1.9 DDM |

TABLE 4-2

| No. | Tg ° C. | Mw |
|---|---|---|
| 10 | 45.0 | 11454 |
| 11 | 44.5 | 19482 |
| 12 | 46.8 | 9705 |
| 13 | −10.6 | 16101 |
| 14 | 45.9 | 26893 |
| 15 | −8.4 | 28940 |
| 16 | 69.2 | 29893 |
| 17 | −17.6 | 24823 |
| 18 | −8.4 | 25459 |
| 19 | 77.1 | 20878 |

Example 5

Polymers in Other Acetoacetate Solvents

Using the method of Example 2, except that the solvent was as listed below, the following polymers were made and tested, with the results shown below. For each polymer, the solvent, the monomers, the initiator, and the chain transfer agent(s), are shown in table 5-1; and the characteristics of the resulting polymers are shown in table 5-2.

TABLE 5-1

| No | Solv | AAEM | BA | MMA | STY | HEMA | AA | MAA | Init | CTA |
|---|---|---|---|---|---|---|---|---|---|---|
| 29 | (1) | 20 | 3.8 | 54.1 | 0 | 14.1 | — | 1.2 | 3.5 | 3.2% MPTMS |
| 30 | (1) | 18.8 | 46.9 | — | 14.1 | 14.1 | — | 0.9 | 3.4 | 1.7% MPTMS |
| 31 | (1) | 19.9 | 44.7 | — | 14.9 | 0.0 | 14.9 | — | 3.6 | 2.0% MPTMS |
| 32 | (1) | 4.9 | 52.3 | — | 22.5 | 0.0 | 14.7 | — | 3.6 | 2.0% MPTMS |
| 33 | (1) | 5.1 | 53.9 | — | — | 35.4 | 1.0 | — | 2.5 | 2.1% MPTMS |
| 34 | (1) | 5.1 | 53.9 | 35.4 | — | — | 1.0 | — | 2.5 | 2.1% MPTMS |
| 35 | (2) | 5.1 | 54 | 35.5 | — | — | — | 5.5 | 2.5 | 1.9 DDM |

Solvent (1) = ethyl acetoacetate
Solvent (2) = isosorbide bisacetoacetate

TABLE 5-2

| No. | Tg ° C. | Mw |
|---|---|---|
| 29 | 66.4 | 22315 |
| 30 | −10.6 | 26439 |
| 31 | −3.8 | 48608 |
| 32 | −5.4 | 40816 |
| 33 | −20.0 | 26461 |
| 34 | −7.3 | 19315 |
| 35 | 69.4 | 24072 |

Example 6

Preparation of Polymer with Tg −35° C.

Using the procedure of Example 1, with solvent of TMP trisAcAc, a polymer was produced with the monomer proportions in parts by weight as follows: 30 AAEM/69 BA/1 AA, using CTA of MPTMS in the amount of 1.8% by weight, based on the total weight of monomer. The resulting polymer solution had 43% polymer solids. The resulting polymer has glass transition temperature (Tg) of −35° C. as calculated by the Fox equation.

Example 7

Mixture with Michael Acceptor

Morcure™ 2000 (5.77 g), TRPGDA (1.93 g) and Cat Mix (1.66 g) were mixed at 45° C. to produce a homogeneous complete mixture. This complete mixture was combined at 45° C. with the homogeneous mixture of Example 6 and mixed briefly. Initial Brookfield viscosity at 45° C. (measured with Brookfield model DV-I+, with spindle number 25, using revolution rate sufficient to give a reading of 20% to 80% of full scale) was 1.7 Pa*S (1700 cps). The viscosity doubling time was 17.3 minutes, which indicates that the complete mixture is capable of useful curing.

The complete mixture, immediately after formation, was coated onto PET film at coat weight of 2.0 g/m$^2$ (1.2 lb/ream). Then, aluminum foil was brought into contact with the coating, and the laminate was pressed between rollers.

A strip 25 mm (1 inch) wide was cut from each laminate. The strip was pulled apart in a tensile tester at speed of 4.2 mm/sec (10 in/min) at 25° C. The peel strength was recorded as the maximum load required to pull the strip apart.

One strip was stored for 24 hours at 25° C. and then peel tested; maximum load was 176 gram. Another strip was stored 48 hours at 25° C.; maximum load was 134 gram.

Example 8

Preparation of Polymer with Tg 58° C.

Using the procedure of Example 1, with solvent of TMP trisAcAc, a polymer was produced with the monomer proportions in parts by weight as follows: 10 AAEM/48 VAc/45 MMA/1 AA, using CTA of MPTMS in the amount of 1.7% by weight, based on the total weight of monomer. The resulting polymer solution had 43% polymer solids. The resulting polymer has glass transition temperature (Tg) of 58° C. as calculated by the Fox equation.

Example 9

Mixture with Michael Acceptor

Morcure™ 2000 (8.19 g), TRPGDA (2.9 g) and Cat Mix (2.49 g) were mixed at 45° C. to produce a homogeneous complete mixture. This complete mixture was combined at 45° C. with the homogeneous mixture of Example 8 and mixed briefly. Initial Brookfield viscosity at 45° C. (measured with Brookfield model DV-I+, with spindle number 25, using revolution rate sufficient to give a reading of 20% to 80% of full scale) was 2.4 Pa*S (2400 cps). The viscosity doubling time was 27.2 minutes, which indicates that the complete mixture is capable of useful curing.

The complete mixture, immediately after formation, was coated onto PET film at coat weight of 2.0 g/m² (1.2 lb/ream). Then, aluminum foil was brought into contact with the coating, and the laminate was pressed between rollers.

A strip 25 mm (1 inch) wide was cut from each laminate. The strip was pulled apart in a tensile tester at speed of 4.2 mm/sec (10 in/min) at 25° C. The peel strength was recorded as the maximum load required to pull the strip apart.

One strip was stored for 24 hours at 25° C. and then peel tested; maximum load was 574 gram. Another strip was stored 48 hours at 25° C.; maximum load was 604 gram.

We claim:

1. A method of making a polymer solution comprising polymerizing one or more monomer in a solvent, wherein said monomer comprises one or more ethylenically unsaturated monomer that is a multi-functional Michael donor, and wherein said solvent comprises 40% or more by weight, based on the weight of said solvent, one or more multi-functional Michael donor that is not ethylenically unsaturated,
   wherein said polymerizing comprises chain reaction of the carbon-carbon double bonds of said ethylenically unsaturated monomer, and
   wherein the polymer in said polymer solution is a multi-functional Michael donor.

2. The method of claim 1, wherein said ethylenically unsaturated monomer that is a multi-functional Michael donor comprises one or more ester of acrylic acid or one or more ester of methacrylic acid or a mixture thereof.

3. The method of claim 1, wherein said one or more monomer comprises, in addition to said ethylenically unsaturated monomer that is a multi-functional Michael donor, one or more ethylenically unsaturated monomer that is not a multi-functional Michael donor.

4. The method of claim 3, wherein said ethylenically unsaturated monomer that is not multi-functional Michael donor comprises one or more neutral monomer selected from the group consisting of olefins, vinyl acetate, styrene, substituted styrenes, alkyl esters of acrylic acid, alkyl esters of methacrylic acid, and mixtures thereof; and wherein said ethylenically unsaturated monomer that is not multi-functional Michael donor additionally comprises one or more carboxyl monomer.

5. A polymer solution made by the method of claim 1.

6. The method of claim 1, wherein every polymer is said polymer solution is a vinyl polymer.

7. The method of claim 1, wherein said polymerizing is free radical polymerization.

8. The method of claim 1, wherein said polymer solution contains little or no ethylenically unsaturated monomer.

9. The method of claim 1, wherein said polymer solution contains 1% or less by weight of ethylenically unsaturated monomer, based on the dry weight of the polymer in said polymer solution.

10. The process of claim 1, wherein said polymerizing leaves most or all Michael donor functional groups intact.

11. A method of making a curable mixture comprising performing the method of claim 1 and mixing said polymer solution with
    (i) one or more multi-functional Michael acceptor and
    (ii) one or more Michael catalyst.

12. A curable mixture made by the method of claim 11.

* * * * *